United States Patent [19]

Pettitt et al.

[11] Patent Number: 5,387,092
[45] Date of Patent: Feb. 7, 1995

[54] A/C COMPRESSOR WITH INTEGRALLY MOLDED HOUSINGS

[75] Inventors: Edward D. Pettitt, Burt; Kurt R. Mittlefehldt, Amherst, both of N.Y.

[73] Assignee: General Motors Corporation, Detroit, Mich.

[21] Appl. No.: 247,193

[22] Filed: May 20, 1994

[51] Int. Cl.$^6$ .............................................. F04B 1/12
[52] U.S. Cl. .................................... 417/269; 417/454; 137/512.15; 137/854; 137/454.4; 137/454.5
[58] Field of Search ................. 417/269, 454, 455; 137/512.15, 854, 454.4, 454.5

[56] References Cited

U.S. PATENT DOCUMENTS

| | | | |
|---|---|---|---|
| 3,910,164 | 10/1975 | Swadner et al. | 92/128 |
| 5,052,898 | 10/1991 | Cook | 417/269 |
| 5,100,306 | 3/1992 | Moran, Jr. et al. | 417/571 |
| 5,219,273 | 6/1993 | Chang | 417/319 |
| 5,316,447 | 5/1994 | Fujii et al. | 417/269 |

Primary Examiner—Richard A. Bertsch
Assistant Examiner—Alfred Basichas
Attorney, Agent, or Firm—Patrick M. Griffin

[57] ABSTRACT

An automotive A/C compressor has a novel discharge valve design that can be easily installed even though the compressor shell is made up of only two housings, each of which integrates head, cylinder bore and discharge chamber, leaving no access between the integral head and bore. A plurality of cylindrical mounting bosses are molded into the heads, one central to each bore. The plane in which the end of each boss is located can be machined independently from the axially overlapping cylinder bore, which assures an intersection of the two. The discharge valve is sized to fit through the other end of the bore into abutment with the boss, and carries a seal that is likewise assured of sealing contact with the bore.

3 Claims, 1 Drawing Sheet

A/C COMPRESSOR WITH INTEGRALLY MOLDED HOUSINGS

This invention relates to automotive air conditioning compressors in general, and specifically to an assembly efficient design which integrates the cylinder bores in the compressor housing.

BACKGROUND OF THE INVENTION

Historically, automotive air conditioning compressors of the shaft driven piston type have had a multipiece, canister shaped outer shell. The shell necessarily must have at least two basic halves or housings, so that shaft, pistons and piston drive means may be assembled inside before the two halves are joined. Beyond the two basic housings, it is common to provide separate end caps, generally called heads, to close the ends of the cylindrical housings. A good example may be seen in co-assigned U.S. Pat. No. 5,219,273. The heads have various refrigerant passages formed in them, which open to the outer ends of the cylinder bores across valve plates, which have a large diameter substantially equal to the inside diameter of the heads. While the separate heads must be sealed, creating two more potential leak paths out of the compressor shell, it is convenient to sandwich the pistons valve plate between the housings and the heads as the heads are installed. Another design approach integrates the heads to the two housings, as shown in U.S. Pat. No. 5,100,306, which eliminates two seals and leak paths. In order to be able to use the same kind of valve plate, however, it is necessary to make separate cylinder bore blocks that fit inside the housing halves. The valve plates are then sandwiched between the now separate cylinder blocks and the integral heads at assembly.

The ultimate integration of pans would be to combine housing, head and cylinder bore as one, thereby allowing only two basic pans to make up the outer shell of the compressor. In that case, however, there is no easy access for assembling a valve plate between the outer ends of the cylinder bores and the integral heads.

SUMMARY OF THE INVENTION

The invention provides a novel discharge valve that can be conveniently installed into a cylinder bore that is part of a totally integral housing.

In the embodiment disclosed, the compressor shell is formed from only two housings, which mate at a single circular seam. Each housing is an integral casing comprising a head at one end, a surrounding outer shell or wall and a plurality of internal cylinder bores. High pressure discharge passages are molded into the heads, and the outer end of each cylinder bore opens to a discharge passage, while its inner end opens unobstructed outside of the housing. Integrally molded to the head is a mounting member, one for each cylinder bore, in the form of a small diameter, coaxial cylindrical boss, the end of which lies in a plane near the outer end of each cylinder bore. Since each cylinder bore is molded open to the discharge passage, a discharge valve is needed to seal and delimit it from the discharge passage.

The discharge valve is a circular disk that carries a one way reed valve and which has a perimeter edge with a diameter substantially equal to the inner surface of the cylinder bore. The perimeter edge also carries an O ring seal that engages the inner surface of the cylinder bore tightly enough to provide a gas tight seal. When the compressor is assembled, a discharge valve is inserted through the unobstructed inner end of each cylinder bore until it abuts the central boss, to which it is secured with a threaded fastener. Then, the pistons, shaft and other components are added, and the two housing are bolted together to provide a sealed interior. In operation, as each piston pulls away from a discharge valve, it admits refrigerant gas from the interior of the compressor shell into the bore. As each piston is driven toward a discharge valve, it opens to admit pressurized gas into the discharge chamber. The axial position of the o ring seal within the cylinder bore is determined solely by the relative location of the bore and boss, and sealing is assured in spite of any variations therein. Likewise, during operation, the central mounting of the valve to the smaller diameter boss can allow it to flex or dimple slightly under high pressure, but the o ring maintains sealing contact with the bore. In conclusion, the compressor and its discharge valve are simply assembled, absorb tolerances well, and maintain cylinder bore sealing under all conditions.

DESCRIPTION OF THE PREFERRED EMBODIMENT

These and other features of the invention will appear from the following written description, and from the accompanying drawings, in which.

Figure 1:
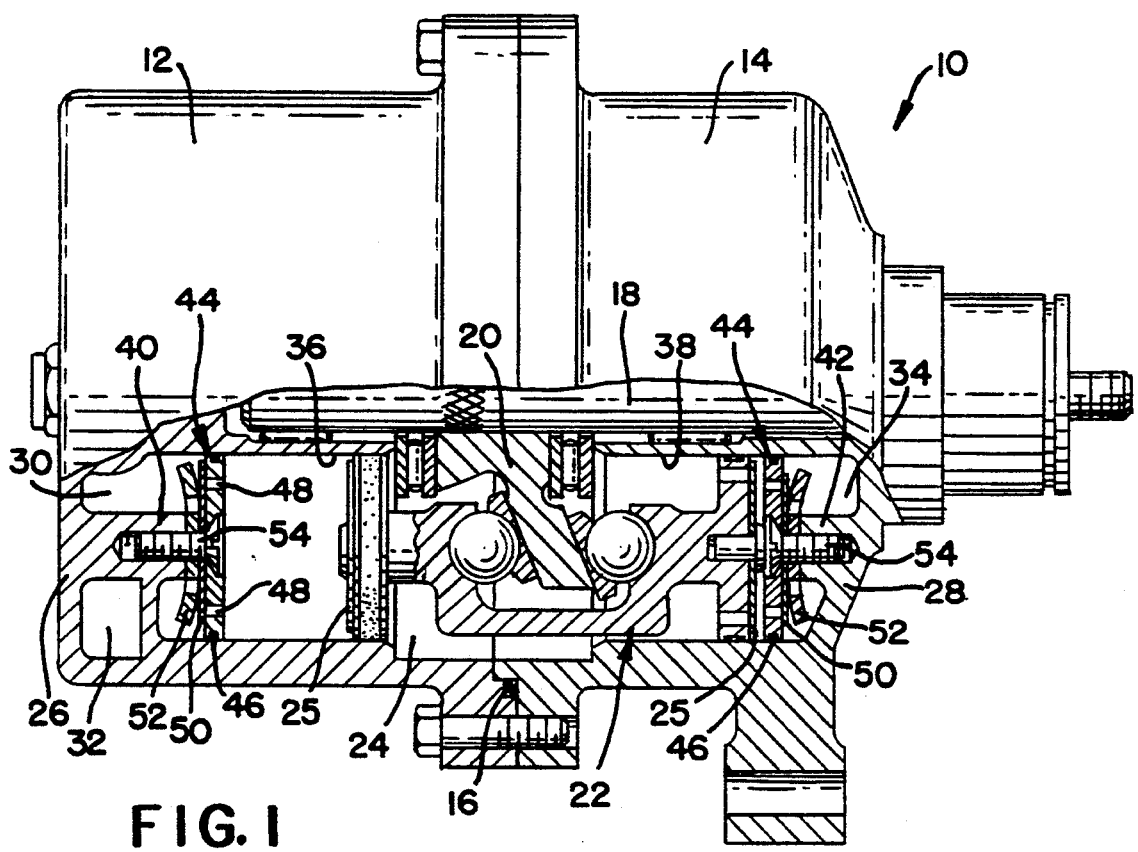
FIG. 1 is a view of a completed compressor partially broken away and section to reveal an opposed pair of cylinder bores and discharge valves.

Referring first to FIG. 1, a preferred embodiment of the compressor of the invention, indicated generally at 10, is in turn comprised of two basic structural components, a rear housing, indicated generally at 12, and front housing, indicated generally at 14. The rear and front housing 12 and 14 are of similar size and shape, basically cylindrical, and differ only as to features not relevant to the subject invention. For purposes of the invention, the housings 12 and 14 can be considered as two nearly identical halves, which are bolted together at a single, central sealed interface 16 to form the basic outer shell of the compressor 10. Several conventional components are assembled inside the housings 12 and 14 before they are fastened together. A central drive shaft 18 runs through front housing 14 to a swash plate type drive mechanism 20 to reciprocate three double sided pistons 22 back and forth, parallel to the central coaxis of shaft 18 and compressor 10. The back of each piston 22 faces a central crankcase cavity 24, and the front carries a conventional inlet reed valve 25. Beyond these basic components, there are numerous bearings, seals, lubrication passages, and refrigerant gas discharge passages in the housings 12 and 14, all of which are also basically conventional, and not described in detail.

Figure 2:
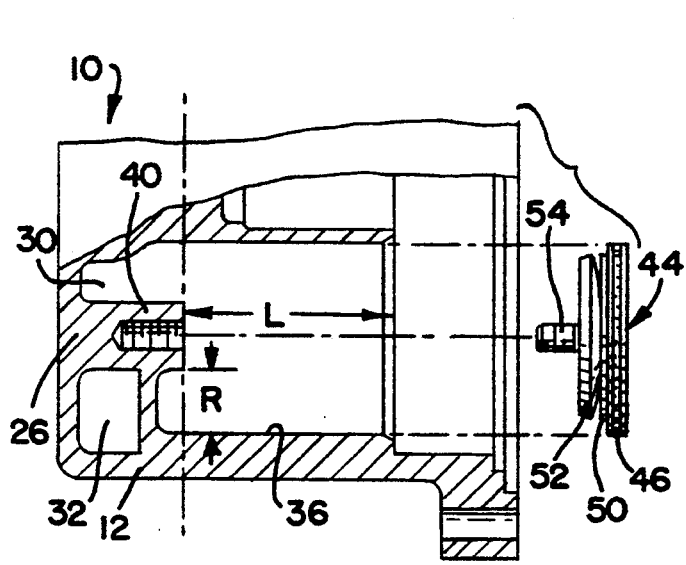
FIG. 2 is a view of one cylinder bore prior to installation of its discharge valve.

Referring next to FIGS. 1 and 2, further details of the structure of the housings 12 and 14 are described. Each housing 12 and 14 includes an integrally cast end cap or head 26 and 28 respectively. The heads 26 and 28 are not identically shaped, and the front head 28 is pierced by the drive shaft 18, while the rear head is pierced by refrigerant inlets and outlets. These openings are separately sealed, however, so the heads 26 and 28 can be conceptualized as basically seamless to the housings 12 and 14. Integrally cast into the rear head 26 are a trough like initial discharge chamber 30 and a final discharge chamber 32, the two of which are interconnected by cross over passages not illustrated. Likewise, cast into the front head 28 is an initial discharge chamber 34, which is connected to final discharge chamber 32 by cross over passages. Each housing 12 and 14 is also molded with three identically sized cylinder bores 36 and 38 respectively, arranged in axially opposed pairs evenly around the central axis of compressor 10. Only two bores 36 and 38 are illustrated. Prior to final assembly, the axially inner end of each bore 36 and 38 opens outside of its respective housing 12 and 14 without obstruction, as best seen in FIG. 2. The axially outer end of each bore 36 and 38 opens to its respective discharge chamber 30 and 34, merging into it smoothly within the casting. In fact, the chambers 30 and 34 are not delimited from the bores 36 and 38 until additional structure described below is installed.

Figure 3:
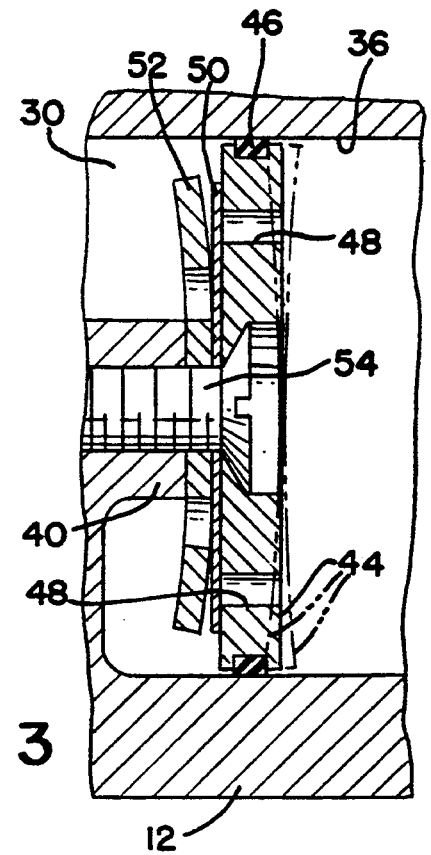
FIG. 3 is an enlargement of one discharge valve in cross section, showing its potential response during compressor operation.

Referring next to FIGS. 2 and 3, a cylindrical boss 40 is also molded into rear head 26, coaxial to bore 36, but of significantly smaller diameter, leaving a radial differential R. The machined flat end of boss 40, indicated by a dotted line in FIG. 2, is spaced a nominal axial distance L from the open end of bore 36, and defines a plane that separates the discharge chamber 30 from each cylinder bore 36. The bore 36 and end of boss 40 can, to an extent, be machined independently. That is, while it is desirable that length L be consistent in order to assure a consistent compression ratio, the fact that the machined surface of bore 36 extends axially well past the end of boss 40 means that the dotted line plane of FIG. 2 will intersect bore 36 somewhere regardless of tolerance variations in L. A comparable boss 42 is provided at each cylinder bore 38 of front housing 14. Each boss 40 and 42 serves as a mounting member for a discharge valve, indicated generally at 44. Each discharge valve 44, which is identical to and interchangeable with the others, is a circular disk with an outer diameter just under the inner diameter of a cylinder bore 36 or 38, as best seen for a rear housing cylinder bore 36 in FIG. 3. The perimeter edge of each valve disk carries an O-ring seal 46 sized to make contact with the inner surface of bore 36 or 38 tightly enough to provide a gas tight seal, but not so tightly as to be immovable. Each is also ported at several evenly spaced locations 48, which are covered by a resilient, thin metal reed 50 and a thicker stop 52. A central threaded fastener 54 passes through all components, and is threadable into the center of boss 40 or 42. This allows valve 44 to be installed, prior to the installation of other components, by inserting it into the unobstructed open end of bore 36 until it abuts the end of boss 40. The center of stop 52 is not bent out, as the perimeter is, so it is possible for it and reed 50 to be snugly gripped between the end of boss 40 and the underside of valve 44 by fastener 54. Because of the relation described between the bosses 40, 42 and bores 36, 38, the O-ring 46 is assured of engagement with the bores 36 or 38.

Referring next to FIG. 3, the operation of valve 44 in bore 36 is illustrated, which is identical for bore 38. Once a valve 44 is installed in each bore 36 and 38, the other internal components, shaft 18, swash plate 20, and pistons 22 are installed, and the housings 12 and 14 are bolted together to seal crankcase cavity 24. As the pistons 22 reciprocate, refrigerant gas in cavity 24 is drawn through inlet valve 25 into bore 36 and compressed. It is then driven through ports 48, bending reed 50 out, potentially as far as stop 52 allows, to drive pressurized gas into the chamber 30. The same applies to the bores 38 and discharge chamber 34. Should the pressure within a bore 36 exceed that which can pass easily through the ports 48, the radial differential R described above allows valve 44 to flex or dimple to an extent within bore 36. The seal 46 maintains dynamic contact with bore 36, because of the same relation of boss 40 and bore 36 that assures static contact. This should provide some reduction of vibration and noise as compared to conventional valve plates, which are rigidly clamped around their perimeter, rather than allowed to float.

Variations in the preferred embodiment could be made. Any number of pistons could be used, or one sided pistons, in which case only one housing would contain cylinder bores. Any valve mounting member molded integrally to the housing, near the inner end of and central to a cylinder bore, would allow the discharge valve to be inserted and assembled as shown. The small diameter boss disclosed, with its large radial clearance from the bore, gives the additional advantage of allowing some flexing in the valve disk. The perimeter seal of the valve could, theoretically, be carried by the surface of the bore. It is simpler to mount it to the edge of the disk, like O ring 46. Therefore, it will be understood that it is not intended to limit the invention to just the embodiment disclosed.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. An automotive air conditioning compressor, comprising, an integrally formed, generally cylindrical first housing having a discharge chamber formed in one end and an internal cylinder bore opening at an outer end into said discharge chamber and opening at an unobstructed inner end outside of said first housing and further including a mounting member located centrally of and near said cylinder bore inner end, a circular discharge valve having a perimeter edge with a diameter substantially equal to the inner surface of said cylinder bore so as to be sealingly engageable with said inner surface and so as to be insertable axially through said cylinder bore through open inner end and into abutment with said mounting member, fastening means for securing said valve to said mounting member, a piston reciprocable within said cylinder bore so as to create a pressurized space between said piston and discharge valve, and, a second housing securable to said first housing after said valve and piston have been assembled to provide a sealed interior compressor space, whereby said discharge valve may be installed through said cylinder bore and secured to said mounting member prior to assembly of said piston and second housing.

2. An automotive air conditioning compressor, comprising, an integrally formed, generally cylindrical first housing having a discharge chamber formed in one end and an internal cylinder bore opening at an outer end into said discharge chamber and opening at an unobstructed inner end outside of said first housing, said housing further including a cylindrical, threaded mounting boss coaxial to said cylinder bore inner end and radially spaced from said cylinder bore inner surface, a circular discharge valve having a perimeter edge with a diameter substantially equal to the inner surface of said cylinder bore so as to be sealingly engageable with said inner surface and so as to be insertable axially through said cylinder bore through open inner end and into abutment with said mounting boss, fastening means for securing said valve to said mounting boss, a piston reciprocable within said cylinder bore so as to create a pressurized space between said piston and discharge valve, and, a second housing securable to said first housing after said valve and piston have been assembled to provide a sealed interior compressor space, whereby said discharge valve may be installed through said cylinder bore and secured to said mounting boss prior to assembly of said piston and second housing with the axial position of said valve perimeter edge within said cylinder bore being determined by the relative position of said mounting boss and cylinder bore.

3. An automotive air conditioning compressor, comprising, an integrally formed, generally cylindrical first housing having a high pressure discharge chamber formed in one end and an internal cylinder bore opening at an outer end into said discharge chamber and opening at an unobstructed inner end outside of said first housing, said housing further including a cylindrical, threaded mounting boss coaxial to and coplanar to said cylinder bore inner end and radially spaced from said cylinder bore inner surface, a circular discharge valve having a perimeter edge with a diameter substantially equal to the inner surface of said cylinder bore so as to be insertable axially through said cylinder bore through open inner end and into abutment with said mounting boss, said valve perimeter edge also carrying a seal engageable with the inner surface of said fastening means for securing said valve to said mounting boss, a piston reciprocable within said cylinder bore so as to create a pressurized space between said piston and discharge valve, and, a second housing securable to said first housing after said valve and piston have been assembled to provide a sealed interior compressor space, whereby said discharge valve may be installed through said cylinder bore and secured to said mounting boss prior to assembly of said piston and second housing with the axial position of said valve perimeter edge and seal within said cylinder bore being determined by the relative position of said mounting boss and cylinder bore.

* * * * *